(12) United States Patent
Naserian et al.

(10) Patent No.: US 12,511,764 B2
(45) Date of Patent: Dec. 30, 2025

(54) METHOD AND SYSTEM TO ASSIST A VEHICLE DRIVER WITH PARKING IN A HOME GARAGE

(71) Applicant: GM Global Technology Operations LLC, Detroit, MI (US)

(72) Inventors: Mohammad Naserian, Windsor (CA); Chuan Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 351 days.

(21) Appl. No.: 18/474,531

(22) Filed: Sep. 26, 2023

(65) Prior Publication Data

US 2025/0104256 A1   Mar. 27, 2025

(51) Int. Cl.
| | |
|---|---|
| *G06T 7/254* | (2017.01) |
| *B60W 30/18* | (2012.01) |
| *B62D 15/02* | (2006.01) |
| *G06V 20/40* | (2022.01) |

(52) U.S. Cl.
CPC ....... *G06T 7/254* (2017.01); *B60W 30/18109* (2013.01); *G06V 20/44* (2022.01); *G06T 2207/20224* (2013.01)

(58) Field of Classification Search
CPC ......... G06T 7/254; G06T 2207/20224; B60W 30/18109; G06V 20/44; B62D 15/027
See application file for complete search history.

(56) References Cited

U.S. PATENT DOCUMENTS

| | | | |
|---|---|---|---|
| 2016/0203721 A1* | 7/2016 | Wright | G08G 1/168 348/118 |
| 2020/0110172 A1* | 4/2020 | DeCia | B62D 15/0285 |
| 2022/0307234 A1* | 9/2022 | Hillier | E02F 9/28 |

* cited by examiner

*Primary Examiner* — Amandeep Saini
*Assistant Examiner* — Andrew S Budisalich
(74) *Attorney, Agent, or Firm* — Vivacqua Crane, PLLC (57) ABSTRACT

A method includes determining that the vehicle is approaching a garage and receiving a video from a garage camera and determining a frame difference per pixel with respect to time as the vehicle moves into the garage and counting a number of rows of pixels with no changes as the vehicle moves into the garage using the frame difference per pixel. Further, the method includes comparing the number of rows of pixels with no changes as the vehicle moves into the garage with a predetermined row threshold to determine whether the number of rows of pixels with no changes with respect to time as the vehicle moves into the garage is less than or equal to the predetermined row threshold and commanding a display to provide a notification indicative that the vehicle is properly parked in the garage.

20 Claims, 7 Drawing Sheets

METHOD AND SYSTEM TO ASSIST A VEHICLE DRIVER WITH PARKING IN A HOME GARAGE

INTRODUCTION

The present disclosure relates to a system and method for assisting a vehicle driver with parking in a home garage.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles are often parked in home garages. Home garages, however, are typically tight spaces, thereby making it challenging for the driver to maneuver and park inside the home garage. For this reason, it is desirable to develop methods and system for assisting a vehicle driver with parking in a home garage.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for localizing a vehicle in a garage camera view. The method includes determining that the vehicle is approaching a garage; in response to determining that the vehicle is approaching the garage and receiving a video from a garage camera; The method further includes determining, using the video received from the garage camera, a frame difference per pixel with respect to time as the vehicle moves into the garage and counting a number of rows of pixels with no changes with respect to time as the vehicle moves into the garage using the frame difference per pixel; comparing the number of rows of pixels with no changes with respect to time as the vehicle moves into the garage with a predetermined row threshold to determine whether the number of rows of pixels with no changes with respect to time as the vehicle moves into the garage is less than or equal to the predetermined row threshold. Also, the method includes determining that the number of rows of pixels with no changes with respect to time as the vehicle moves into the garage is less than or equal to the predetermined row threshold and, in response to determining that the number of rows of pixels with no changes with respect to time as the vehicle moves into the garage is less than or equal to the predetermined row threshold, commanding a display to provide a notification indicative that the vehicle is properly parked in the garage. Other embodiments of this aspect include corresponding computer systems, apparatus, and computer programs recorded on one or more computer storage devices, each configured to perform the actions of the methods.

Implementations may include one or more of the following features. The method may include determining that a background view of an interior of the garage is cached. The method may include using the cached background view of the interior of the garage to determine the frame difference per pixel with respect to time as the vehicle moves into the garage. The method may include determining that a background view of an interior of the garage is not cached. The method may include using a live background view of an interior of the garage to determine the frame difference per pixel with respect to time as the vehicle moves into the garage. The vehicle includes a vehicle controller, and the vehicle controller wirelessly receives the video from the garage camera. The vehicle autonomously stops in response to determining that the number of rows of pixels with no changes with respect to time as the vehicle moves into the garage is less than or equal to the predetermined row threshold. The method may include commanding the display to show boundary lines while the vehicle moves into the garage. The boundary lines include a first lateral line along the first side of the vehicle. The boundary lines include a second lateral line along a second side of the vehicle. The second side of the vehicle is opposite the first side of the vehicle. The boundary lines include a front wall adjacent to the front wall of the garage. The boundary lines are movable via user input through a user interface of the vehicle. The method may include determining whether at least one sideview mirrors of the vehicle is folded and commanding the display the video captured by the garage camera while the vehicle moves into the garage in response to determining that the sideview mirrors of the vehicle are folded. Further, the method may include commanding the display to show the boundary lines superimposed over the video captured by the garage camera while the vehicle moves into the garage. The pixel location of the garage door on the video has a garage door pixel-row value. Implementations of the described techniques may include hardware, a method or process, or computer software on a computer-accessible medium.

The present disclosure also describes a system for localizing a vehicle in a garage camera view. The system includes a vehicle controller, a display in communication with the vehicle controller, and a communication transceiver in communication with the vehicle controller and a garage camera located inside a garage. The vehicle controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
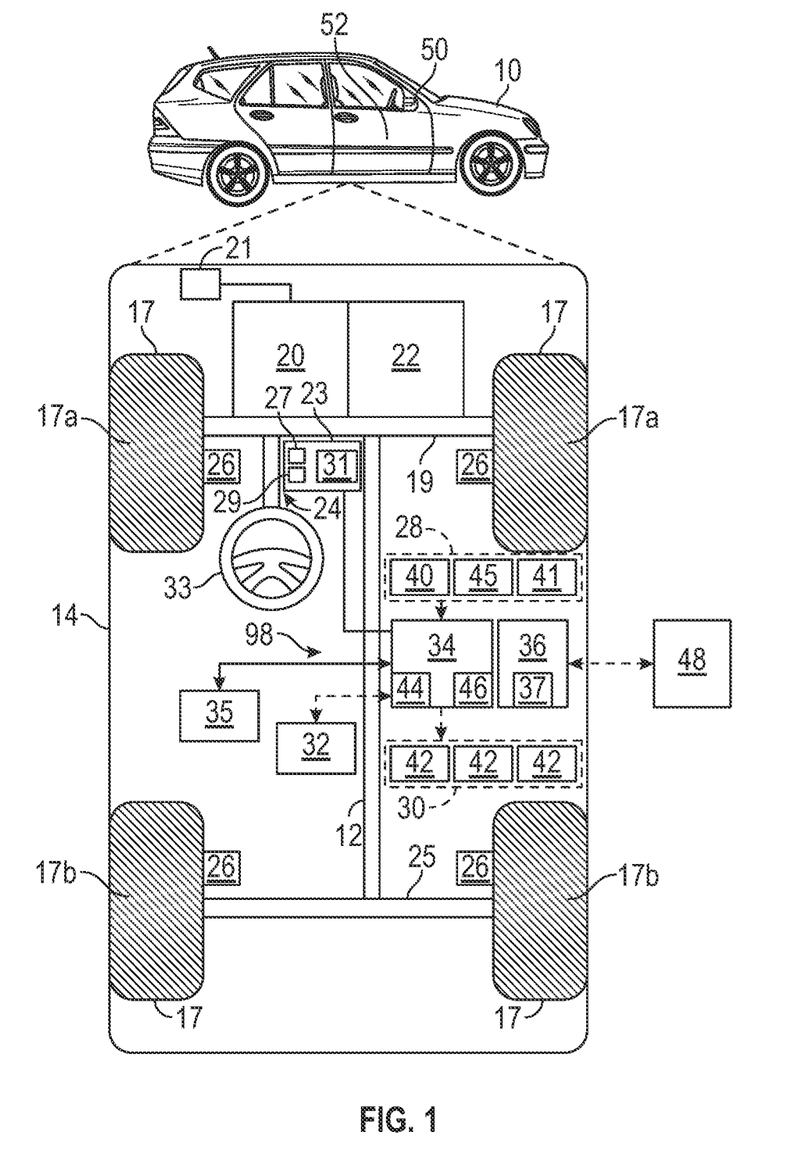
FIG. 1 is a block diagram depicting an embodiment of a vehicle.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

The vehicle 10 may be an autonomous vehicle, and a control system 98 may be part or work together with the vehicle 10. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT) within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one vehicle controller 34, and a communication system 36. The steering system 24 is a steer-by-wire system. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the vehicle controller 34 and may include, but are not limited to, one or more steering wheel sensors 45, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more vehicle cameras 41, one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the vehicle controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors 52, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The vehicle 10 may further include one or more airbags 35 in communication with the vehicle controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 of the vehicle 10 may be referred to as a vehicle controller and may be programmed to execute a method 100 (FIG. 5), method 200 (FIG. 6), and/or method 300 (FIG. 7) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single vehicle controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the vehicle controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the vehicle controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the vehicle controller 34 is configured to receive inputs from the user via the user interface 23. The vehicle 10 may include one or more displays 29 configured to display information to the vehicle occupant 11 (e.g., vehicle operator or passenger).

The communication system 36 is in communication with the vehicle controller 34 and is configured to wirelessly communicate information to and from other remote entities 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or vehicle transceivers 37 for receiving and/or transmitting signals, such as cooperative sensing messages (CSMs). The vehicle transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

The vehicle 10 includes one or more sideview mirrors 50. While only one sideview mirror 50 is shown, it is envisioned that the vehicle 10 may include at least two sideview mirrors 50. That is, the vehicle 10 may include one sideview mirror 50 in each side. Each sideview mirror 50 may be movably coupled to the body 14. As such, the sideview mirrors 50 may be foldable (e.g., pivotable) toward and away from the vehicle door 52.

Figure 2:
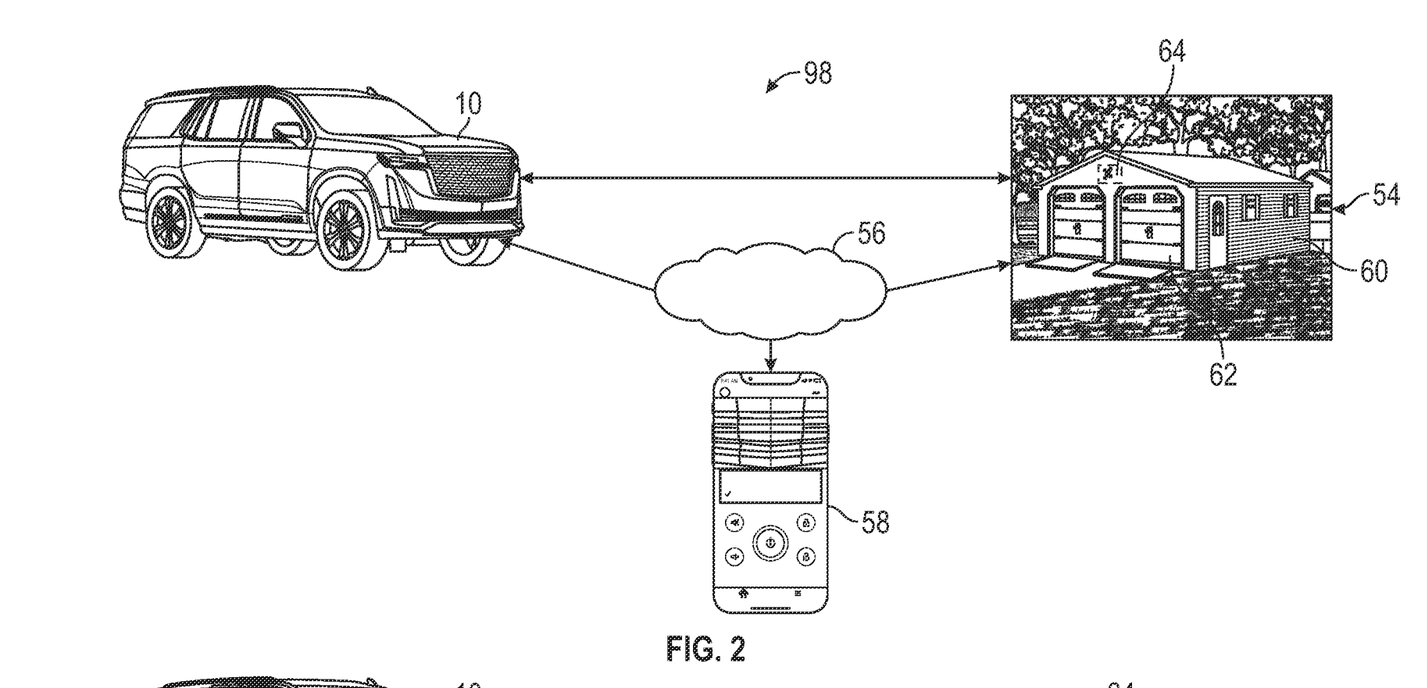
FIG. 2 is a schematic diagram of a system for assisting a vehicle driver with parking in a home garage.

With reference to FIG. 2, the system 98 includes the vehicle, a connected home 54, an external server 56, and a mobile device 58. The term "connected home" is a dwelling networked to enable the interconnection and interoperability of multiple devices, services, and apps, ranging from communications and entertainment to healthcare, security and home automation. The vehicle 10 is in wireless communication with the connected home 54, the external server, 56, and the mobile device 58. The term "mobile device" means a handheld computer, such as a smartphone, a table, or an e-reader. The mobile device 58 includes an app for sensing notification and/or receiving inputs from a user. The connected home 54 includes a home garage 60 for storing vehicles, such as the vehicle 10. The home garage 60 includes a garage door 62 and one or more wireless garage cameras 64 attached to the ceiling and/or a wall of the home garage 60. The garage cameras 64 may collectively or individually have a field of view sufficiently large to capture images of the entire interior of the home garage 60.

The connected home 54 is in wireless communication with the vehicle 10 and the external server 56. The vehicle 10, for instance, is configured to send vehicle-type data to the connected home 54 using the vehicle transceivers 37. The vehicle-type data is indicative of the vehicle type (e.g., electric vehicle, internal combustion engine vehicle, hybrid vehicle, etc.). The vehicle 10 also includes map data, which includes information about the location of the home garage 60 of the connected home 54. The connected home 54 is configured to send home data to the vehicle 10 and/or the external server 56. The home data may include information about the status and/or resolution of the garage camera 64, the mount location of the garage camera 64 and/or the status (open or close) of the garage door 62.

The vehicle 10 is also in wireless communication with the external server 56. Accordingly, the vehicle 10 is configured to send vehicle data to the external server 56. The external server 56 is in wireless communication with the mobile device 58, which is running the app. The mobile device 58 may provide notifications to a user through the app. For example, these notifications may include information about the connected home 54 and/or the vehicle 10, such as the status of the garage door 62 (e.g., open or close), whether the engine of the vehicle 10 is on for more than a predetermined amount of time, the fact that the vehicle 10 entered the home garage 60, the fact that the vehicle 10 exited the home garage 60, and/or the fact that the vehicle 10 (if EV) is inside the home garage 60 but not connected to a charger. The app running on the mobile device 58 may be used as a garage door opener. As a non-limiting example, the vehicle 10 is wirelessly connected to the connected home 54 and the wireless garage camera 64 via Wi-Fi. The term "Wi-Fi" means a family of wireless network protocols based on the IEEE 802.11 family of standards, which are commonly used for local area networking of devices and Internet access, allowing nearby digital devices to exchange data by radio waves. It is envisioned, however, that the vehicle 10 may be wirelessly connected to the garage camera using other networking protocols.

Figure 3:
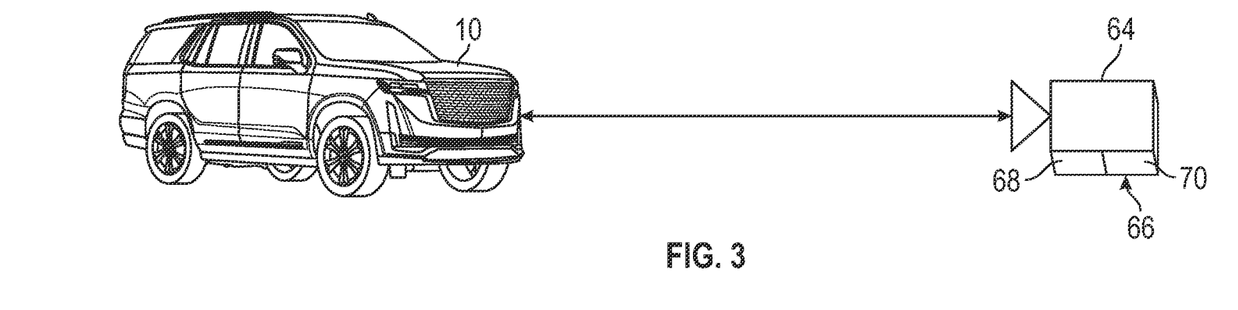
FIG. 3 is a schematic diagram of the vehicle of FIG. 1 wirelessly connected to a home garage camera.

With reference to FIG. 3, the vehicle 10 is in wireless communication with the garage camera 64 using a short-range wireless technology standard, such as BLUETOOTH. Regardless of the wireless technology standard used to connect the vehicle 10 to the garage camera 64, the garage camera 64 includes a camera controller 66. The camera controller 66 includes at least one camera processor 68 and a camera non-transitory computer readable storage device or media 70. The camera processor 68 may be a custom made or commercially available processor, a central processing unit (CPU), a graphics processing unit (GPU), an auxiliary processor among several processors associated with the camera controller 66, a semiconductor-based microprocessor (in the form of a microchip or chip set), a macroprocessor, a combination thereof, or generally a device for executing instructions. The camera computer readable storage device or media 70 may include volatile and nonvolatile storage in read-only memory (ROM), random-access memory (RAM), and keep-alive memory (KAM), for example. KAM is a persistent or non-volatile memory that may be used to store various operating variables while the camera processor 68 is powered down. The camera computer-readable storage device or media 70 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the camera controller 34 in controlling the camera 64.

Figure 4:
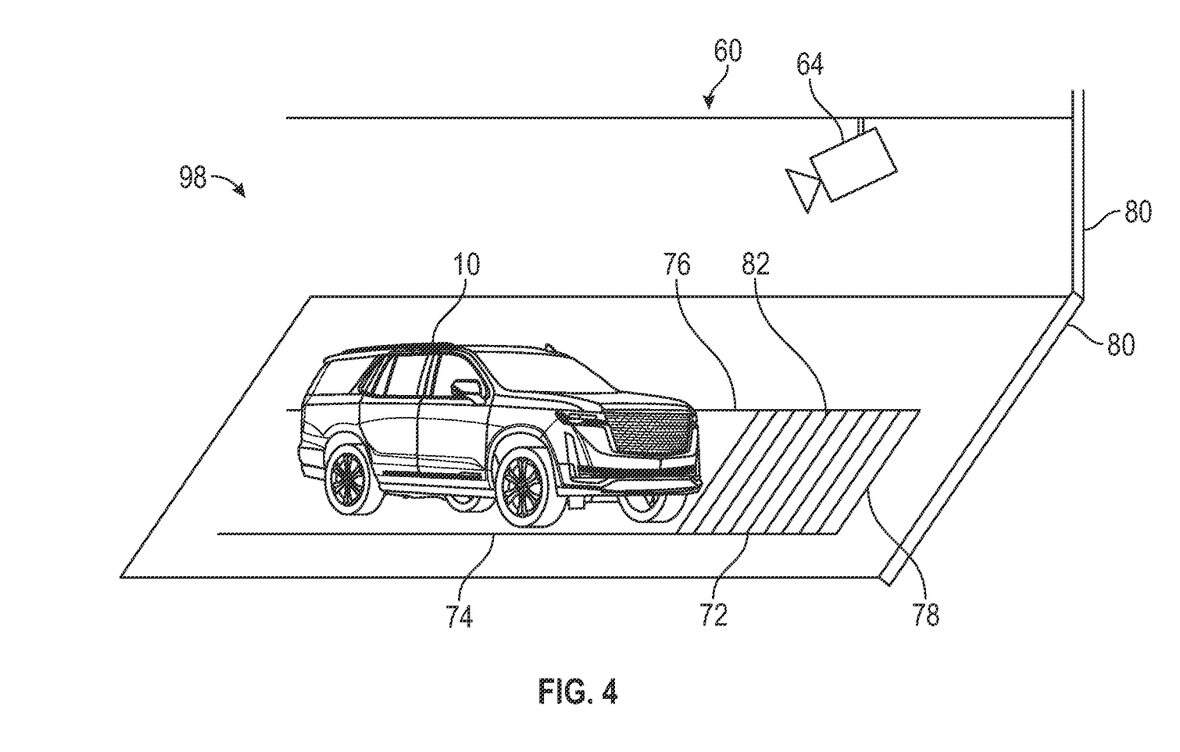
FIG. 4 is a schematic diagram of the vehicle 10 inside a home garage.

With reference to FIG. 4, the system 98 is configured to command the display 29 (FIG. 1) of the vehicle 10 to show images (i.e., video) from the garage camera 64 when vehicle 10 is entering and/or exiting the home garage 60 to help the driver with maneuver the vehicle 10 inside the home garage 60. Specifically, the system 98 may command the display 29 to show the boundary lines 72 superimposed over the video captured by the garage camera 64 while the vehicle 10 moves into (or out of) the home garage 60. The boundary lines 72 help the driver of the vehicle 10 to maneuver the vehicle 10 inside the home garage 60. The boundary lines 72 includes a first lateral line 74 along a first side of the vehicle 10, a second lateral line 76 along a second side of the vehicle 10 (which is opposite to the first side of the vehicle 10), and a third boundary line 78 adjacent a front wall 80 of the home garage 60. The front wall 80 is located opposite the garage door 62 of the home garage 60. The position, size, color, and length of the boundary lines 72 are customizable via user input through the user interface 23 of the vehicle 10 and/or through the mobile device 58. For example, the position of the boundary lines 72 may be moved by the user to accommodate for other objects inside the home garage 60.

Figure 5:
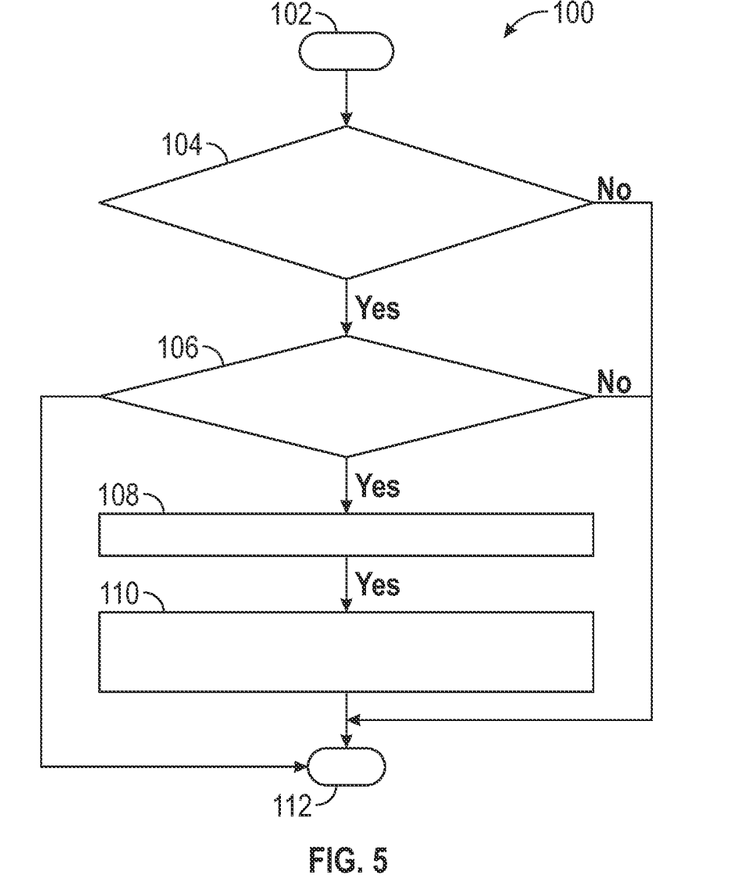
FIG. 5 is a flowchart of a method for assisting a vehicle driver with parking in a home garage.

FIG. 5 is a flowchart of a method 100 for assisting a vehicle driver with parking in the home garage 60. The method 100 begins at the start block 102. Then, the method 100 proceeds to block 104. At block 104, the vehicle controller 34 determines whether the vehicle 10 is entering the home garage 60. To do so, the vehicle controller 34 retrieves and uses the map data, which includes the location of the home garage 60 of the connected home 54. By using the map data, the vehicle controller 34 can determine the location of the vehicle 10 relative to the home garage 60 and therefore determine whether the vehicle 10 is entering the home garage 60. Next, the method 100 continues to block 106. At block 106, the vehicle controller 34 receives the video (i.e., images) from the garage camera 64. The vehicle controller 34 then determines whether the images from the garage camera 64 are sufficiently clear to help the driver maneuver into the home garage 60. If the images from the garage camera 64 are not sufficiently clear to help the driver maneuver into the home garage 60, then the method 100 proceeds to block 112. At block 112, the method 100 ends. If the images from the garage camera 64 are sufficiently clear to help the driver maneuver into the home garage 60, then the method 100 proceeds to block 108. At block 108, the vehicle controller 34 processes the images received from the garage camera 64 and commands the display 29 to show the captured images (e.g., video). As discussed above, the display 29 shows the boundary lines 72 superimposed over the video captured by the garage camera 64 while the vehicle 10 moves into the home garage 60. Also, the display 29 may show one or more selected views to the driver (e.g., left view, right view, front, view or all views). The method 100 then proceeds to block 110. At block 110, the vehicle controller 34 provides the vehicle driver the option to fold (e.g., pivot) the sideview mirrors 50 toward to permit unobstructed passage of the vehicle 10 into the home garage 60. In response, the vehicle driver may use the user interface 23 to provide an input, commanding the sideview mirrors 50 to fold (e.g., pivot). As a non-limiting example, the vehicle controller 34 may provide the notification of the option to fold the sideview mirrors 50 to the vehicle user through the user interface 23 solely in response to determining that the vehicle 10 is at a distance from at least one of the boundary lines 72 (e.g., first lateral line 74 or the second lateral line 76) that is less than a predetermined distance threshold from that boundary line 72.

It is envisioned that at least part of block 110 may be executed before block 108. In such case, the vehicle controller 34 first determines one or more of the sideview mirrors 50 of the vehicle 10 are folded. In response to determining that one or more of the sideview mirrors 50 of the vehicle 10 are folded (or the surrounded view is otherwise unavailable), the vehicle controller 34 commands the display 29 to show the video (e.g., images) captured by the garage camera 64 as the vehicle 10 moves into the home garage 60. Further, as discussed above, the vehicle controller 34 commands the display 29 to show the boundary lines 72 superimposed over the video captured by the garage camera 64 while the vehicle 10 moves into the home garage 60.

Figure 6:
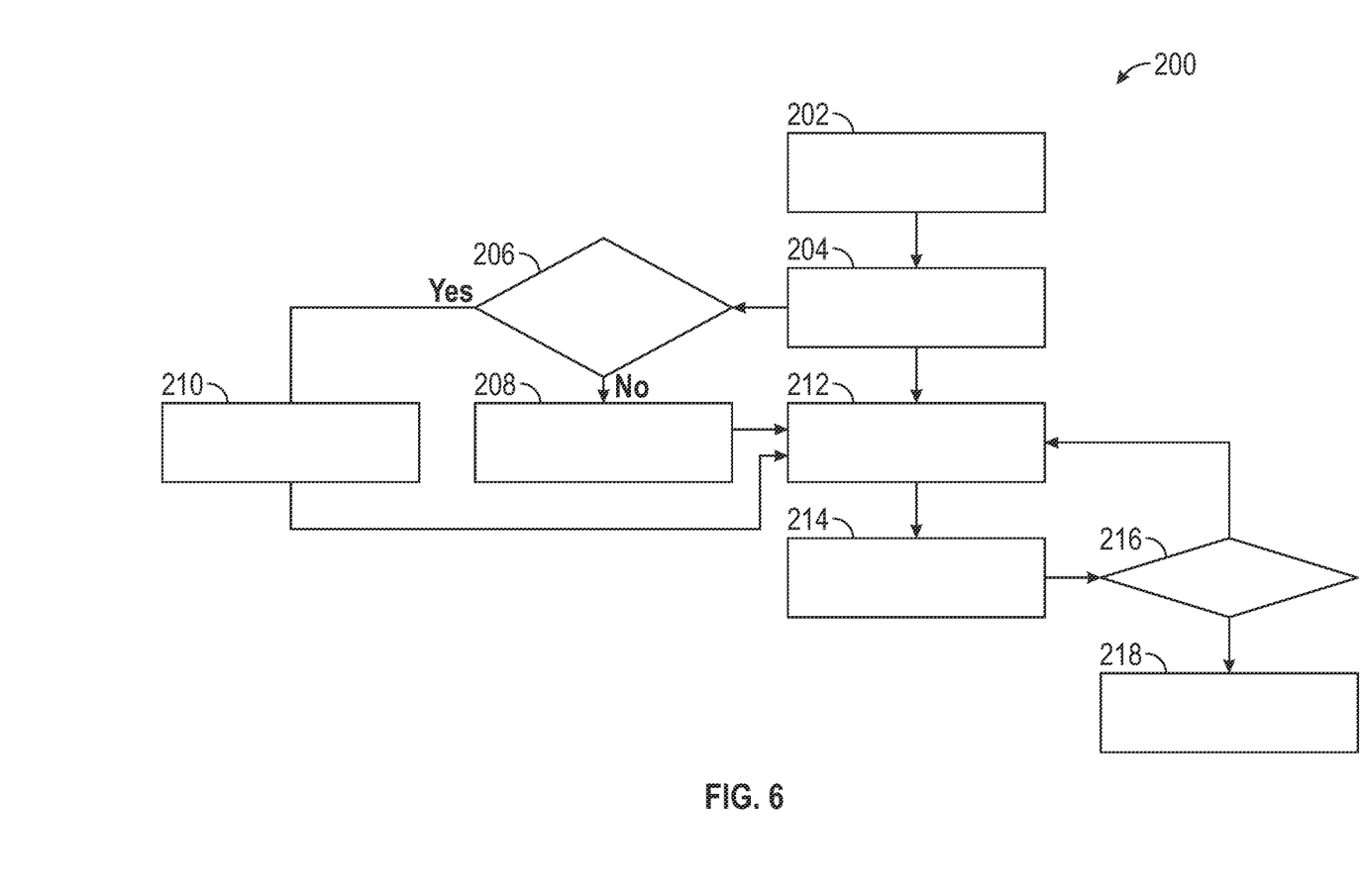
FIG. 6 is a flowchart of another method for assisting a vehicle driver with parking in a home garage.

FIG. 6 is a flowchart of another method 200 for assisting a vehicle driver with parking in the home garage 64. The method 200 may be combined with part or the entirety of the method 100 described above. The method 100 begins at block 202. At block 202, the vehicle controller 34 uses the map data and geofencing to determine whether the vehicle 10 is approaching or entering the home garage 60. Then, the method 200 continues to block 204.

At block 204, the vehicle controller 34 requests and receives the garage camera view (i.e., the video captured by the garage camera 64). Next, the method 200 continues to block 206. At block 206, the vehicle controller 34 determines whether the background view of the video captured by the garage camera 64 has been cached. The background view of the video captured by the garage camera 64 includes the images of the static objects inside the home garage 60, except for the vehicle 10 if the vehicle 10 is stationary. If the background view of the video captured by the garage camera 64 has not been cached, then the method 200 proceeds to block 208. If the background view of the video captured by the garage camera 64 has been cached, then the method 200 proceeds to block 210. At block 210, the vehicle controller 34 uses the cached background view of the interior of the home garage 60 to determine the frame difference per pixel as discussed below with respect to block 212. Then, the method 200 continues to block 212. At block 208, the vehicle controller 34 uses the live background view of the interior of the home garage 60 to determine the frame difference per pixel as discussed below with respect to block 212. Then, the method 200 continues to block 212.

At block 212, the vehicle controller 34 performs a frame difference calculation (per pixel) to determine the distance from the vehicle 10 to the third boundary line 78 and/or the front wall 80 of the home garage 60. As discussed below, if the distance from the vehicle 10 to the third boundary line 78 and/or the front wall 80 of the home garage 60 is less than a predetermined distance threshold, then vehicle controller 34 commands the display 29 display to provide a notification (via the user interface 23) indicative that the vehicle 10 is properly parked in the home garage 60 and, therefore, the vehicle driver should stop the vehicle. This notification may be visual through the display 29 and/or auditory through the speakers 27. Additionally, or alternatively, the vehicle controller 34 may autonomously stop if the distance from the vehicle 10 to the third boundary line 78 and/or the front wall 80 of the home garage 60 is less than a predetermined distance threshold.

With reference to FIGS. 4 and 6, the frame difference calculation at block 212 may be performed by determining which frames have changed with respect to time as the vehicle 10 moves into the home garage 60. Then, the method 200 continues to block 214. The vehicle controller 34 counts the number of rows 82 of pixels (FIG. 4) with no changes with respect to time as the vehicle 10 moves into the home garage using the frame difference per pixel. Then, the method 200 continues to block 216. At block 216, the vehicle controller 34 compares the number of rows 82 of pixels (FIG. 4) with no changes determined in block 214 with a predetermined row threshold to determine whether the number of rows of pixels with no changes with respect to time as the vehicle 10 moves into the home garage 60 is equal to or less than the predetermined row threshold. If the number of rows of pixels with no changes with respect to time as the vehicle 10 moves into the home garage 60 is greater than the predetermined row threshold, then the method 200 returns to block 212. If the number of rows of pixels with no changes with respect to time as the vehicle 10 moves into the home garage 60 is equal to or less than the predetermined row threshold, then the method 200 continues to block 218. At block 218, the vehicle controller 34 commands the display 29 to provide a notification (via the user interface 23). The notification is indicative that the vehicle 10 is properly parked in the home garage 60. This notification may be visual through the display 29 and/or auditory through the speakers 27. Additionally, or alternatively, the vehicle controller 34 may autonomously stop if the number of rows of pixels with no changes with respect to time as the vehicle 10 moves into the home garage 60 is equal to or less than the predetermined row threshold.

Figure 7:
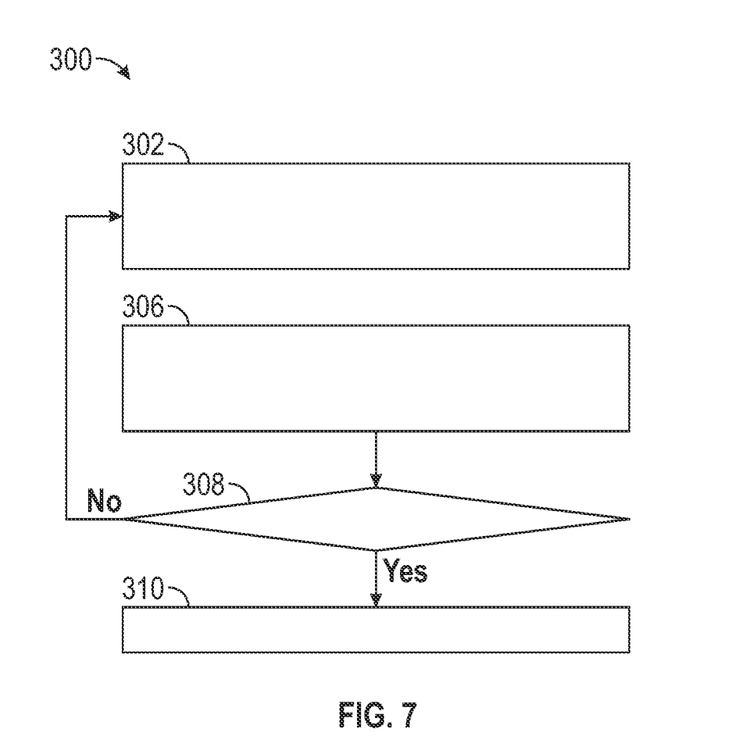
FIG. 7 is a flowchart of another method for assisting a vehicle driver with parking in a home garage.
Figure 8:
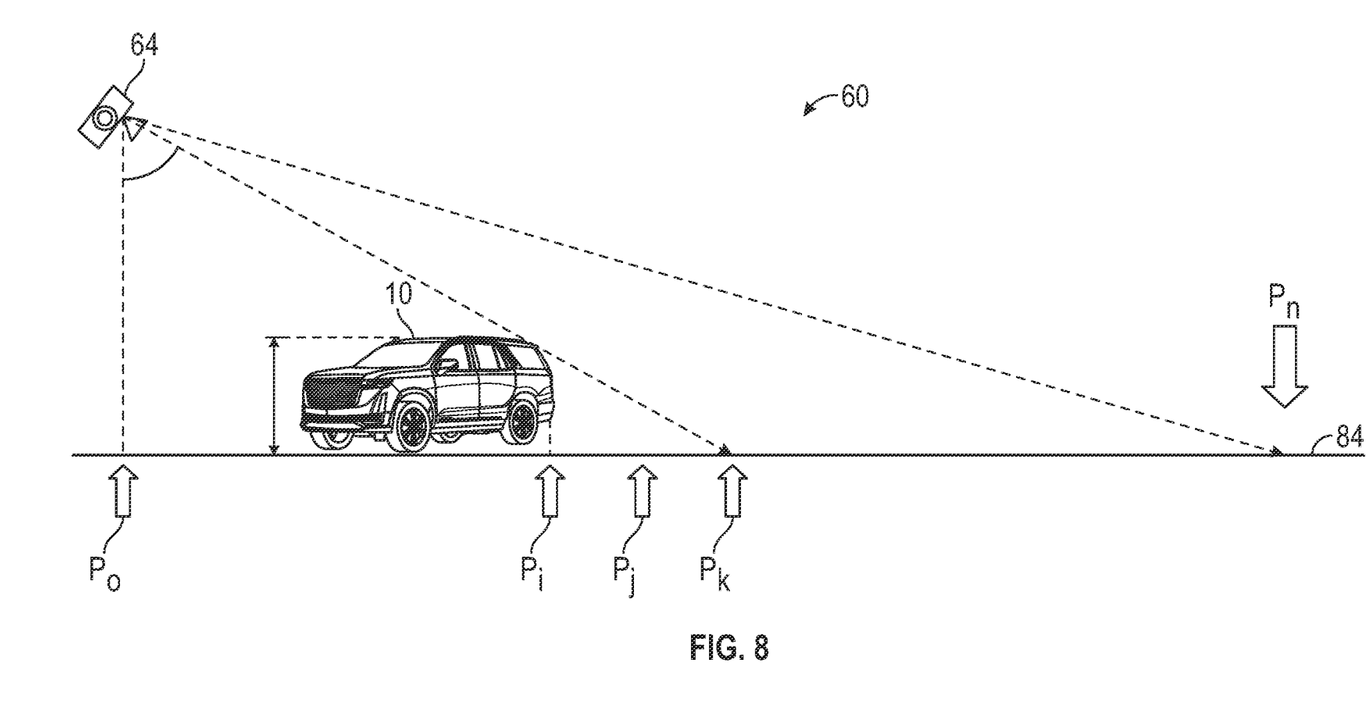
FIG. 8 is a schematic diagram of the vehicle, the garage floor and the garage camera.

With reference to FIGS. 7 and 8, a method 300 for assisting a vehicle driver to park in the home garage 60. The method 300 may be combined with part or the entire method 100 and/or the method 200. The method 300 uses geometry with a calibrated camera view. As shown in FIG. 8, the vehicle height h and the camera height H are known. The vehicle height h is defined as the distance from the garage floor 84 of the home garage 60 to vehicle ceiling and the camera height H is the distance from the garage floor 84 to the garage camera 64. The garage door pixel location $p_j$ is also known. The garage door pixel location $p_j$ is the location of the image where the garage door 62 is located when the garage door is properly closed. The zero-pixel location $p_0$ may be designated as the location of the where the garage camera 64 is mounted. Using the images captured by the garage camera 64, the vehicle controller 34 may determine the vehicle-obstruction pixel location $p_i$, the unobstructed garage floor pixel location $p_k$, and the end-of-the field of view pixel location $p_n$. The vehicle-obstruction pixel location $p_i$ is the pixel location of an image of the garage floor 84 that is closest to the vehicle 10 that is not obstructed by the vehicle 10. The unobstructed garage floor pixel location $p_k$ is the pixel location of the image of part of the vehicle 10 that obstructs the vehicle 10 of the garage floor 84. The end-of-the field of view pixel location $p_n$ is the pixel location at the end of the field of view of the garage camera 64. Each of the pixel locations has a value depending on its location relative to the zero-pixel location $p_0$. That is, the farther the pixel is located relative to the zero-pixel location $p_0$, the higher the value of the pixel location.

The method 300 begins at block 302. At block 302, the vehicle controller 34 determines the vehicle pixel location of the vehicle 10 on the video received from the garage camera 64. Specifically, the vehicle controller 34 determines the vehicle-obstruction pixel location $p_i$, which is the pixel location of an image of the garage floor 84 that is closest to the vehicle 10 that is not obstructed by the vehicle 10. Then, the method 300 continues to block 304. At block 304, the vehicle controller 34 determines unobstructed garage floor pixel location $p_k$, which is the pixel location of the image of part of the vehicle 10 that obstructs the vehicle 10 of the garage floor 84. Then, the method 300 continues to block

306. At block 306, the vehicle controller 34 checks whether the difference between the value of the unobstructed garage floor pixel location $p_k$ and the vehicle-obstruction pixel location $p_i$ is equal to or less than a predetermined threshold. If the difference between the value of the unobstructed garage floor pixel location $p_k$ and the vehicle-obstruction pixel location $p_i$ is greater than the predetermined threshold, then the method 300 returns to block 302. If the difference between the value of the unobstructed garage floor pixel location $p_k$ and the vehicle-obstruction pixel location $p_i$ is equal to or less than the predetermined threshold, then the method 300 proceeds to block 310. At block 310, the vehicle controller 34 determines that the vehicle 10 has moved past the garage door 62 of the garage based on the vehicle pixel location (i.e., vehicle-obstruction pixel location $p_i$) of the vehicle 10 on the video received from the garage camera 64. In response, the vehicle controller 34 commands the display 29 to provide a notification indicative that the vehicle 10 is properly parked in the home garage 60. The notification is indicative that the vehicle 10 is properly parked in the home garage 60. This notification may be visual through the display 29 and/or auditory through the speakers 27. Additionally, or alternatively, the vehicle controller 34 may autonomously stop if the number of rows of pixels with no changes with respect to time as the vehicle 10 moves into the home garage 60 is equal to or less than the predetermined row threshold.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for localizing a vehicle in a garage camera view, comprising:
   determining that the vehicle is entering a garage;
   in response to determining that the vehicle is approaching the garage, receiving a video from a garage camera;
   determining, using the video received from the garage camera, a frame difference per pixel with respect to time as the vehicle moves into the garage;
   counting a number of rows of pixels with no changes with respect to time as the vehicle moves into the garage using the frame difference per pixel;
   comparing the number of rows of pixels with no changes with respect to time as the vehicle moves into the garage with a predetermined row threshold to determine whether the number of rows of pixels with no changes with respect to time as the vehicle moves into the garage is less than or equal to the predetermined row threshold;

determining that the number of rows of pixels with no changes with respect to time as the vehicle moves into the garage is less than or equal to the predetermined row threshold; and in response to determining that the number of rows of pixels with no changes with respect to time as the vehicle moves into the garage is less than or equal to the predetermined row threshold, commanding a display to provide a notification indicative that the vehicle is properly parked in the garage.

2. The method of claim 1, further comprising determining that a background view of an interior of the garage is cached.

3. The method of claim 2, further comprising using the cached background view of the interior of the garage to determine the frame difference per pixel with respect to time as the vehicle moves into the garage.

4. The method of claim 1, further comprising determining that a background view of an interior of the garage is not cached.

5. The method of claim 1, further comprising using a live background view of an interior of the garage to determine the frame difference per pixel with respect to time as the vehicle moves into the garage.

6. The method of claim 1, wherein the vehicle includes a vehicle controller, and the vehicle controller wirelessly receives the video from the garage camera.

7. The method of claim 1, wherein the vehicle autonomously stops in response to determining that the number of rows of pixels with no changes with respect to time as the vehicle moves into the garage is less than or equal to the predetermined row threshold.

8. The method of claim 1, further comprising commanding the display to show boundary lines while the vehicle moves into the garage, the boundary lines includes a first lateral line along a first side of the vehicle, the boundary lines include a second lateral line along a second side of the vehicle, the second side of the vehicle is opposite the first side of the vehicle, the boundary lines includes a third boundary line adjacent to a front wall of the garage, and the boundary lines are movable via user input through a user interface of the vehicle.

9. The method of claim 8, further comprising:
determining whether at least one sideview mirrors of the vehicle is folded;
commanding the display the video captured by the garage camera while the vehicle moves into the garage in response to determining that the sideview mirrors of the vehicle are folded; and
commanding the display to show the boundary lines superimposed over the video captured by the garage camera while the vehicle moves into the garage in response to determining that the sideview mirrors of the vehicle are folded.

10. The method of claim 1, further comprising:
determining a vehicle pixel location of the vehicle on the video received from the garage camera;
determining that the vehicle has moved past a garage door of the garage based on the vehicle pixel location of the vehicle on the video received from the garage camera;
in response to determining that the vehicle has moved past the garage door of the garage based on the vehicle pixel location of the vehicle on the video received from the garage camera, command the display to provide a notification indicative that the vehicle is properly parked in the garage; and
determining a pixel location of the garage door on the video received from the garage camera, wherein the pixel location of the garage door on the video has a garage door pixel-row value.

11. A system for localizing a vehicle in a garage camera view, comprising:
a vehicle controller;
a display in communication with the vehicle controller; and
a communication transceiver in communication with the vehicle controller and a garage camera located inside a garage;
wherein the vehicle controller is programmed to:
determine that the vehicle is entering a garage;
in response to determining that the vehicle is approaching the garage, receive video from a garage camera;
determine, using the video received from the garage camera, a frame difference per pixel with respect to time as the vehicle moves into the garage;
count a number of rows of pixels with no changes with respect to time as the vehicle moves into the garage using the frame difference per pixel;
compare the number of rows of pixels with no changes with respect to time as the vehicle moves into the garage with a predetermined row threshold to determine whether the number of rows of pixels with no changes with respect to time as the vehicle moves into the garage is less than or equal to the predetermined row threshold;
determine that the number of rows of pixels with no changes with respect to time as the vehicle moves into the garage is less than or equal to the predetermined row threshold; and
in response to determining that the number of rows of pixels with no changes with respect to time as the vehicle moves into the garage is less than or equal to the predetermined row threshold, command the display to provide a notification indicative that the vehicle is properly parked in the garage.

12. The system of claim 11, wherein the vehicle controller is programmed to determine that a background view of an interior of the garage is cached.

13. The system of claim 12, wherein the vehicle controller is programmed to use the cached background view of the interior of the garage to determine the frame difference per pixel with respect to time as the vehicle moves into the garage.

14. The system of claim 11, wherein the vehicle controller is programmed to determine that a background view of an interior of the garage is not cached.

15. The system of claim 11, wherein the vehicle controller is programmed to use a live background view of an interior of the garage to determine the frame difference per pixel with respect to time as the vehicle moves into the garage.

16. The system of claim 11, wherein the vehicle controller wirelessly receives the video from the garage camera.

17. The system of claim 11, wherein the vehicle controller is programmed to command a vehicle to autonomously stop in response to determining that the number of rows of pixels with no changes with respect to time as the vehicle moves into the garage is less than or equal to the predetermined row threshold.

18. The system of claim 11, wherein the vehicle controller is programmed to command a display to show boundary lines while the vehicle moves into the garage, the boundary lines includes a first lateral line along a first side of the vehicle, the boundary lines include a second lateral line along a second side of the vehicle, the second side of the vehicle is opposite the first side of the vehicle, the boundary lines includes a third boundary line adjacent to a front wall of the garage, and the boundary lines are movable via user input through a user interface of the vehicle.

19. The system of claim 18, wherein the vehicle controller is programmed to:
- determine whether at least one sideview mirrors of the vehicle is folded;
- command the display the video captured by the garage camera while the vehicle moves into the garage in response to determining that the sideview mirrors of the vehicle are folded; and
- command the display to show the boundary lines superimposed over the video captured by the garage camera while the vehicle moves into the garage.

20. The system of claim 11, wherein the vehicle controller is programmed to:
- determine a vehicle pixel location of the vehicle on the video received from the garage camera;
  - determine that the vehicle has moved past a garage door of the garage based on the vehicle pixel location of the vehicle on the video received from the garage camera; and
  - in response to determining that the vehicle has moved past the garage door of the garage based on the vehicle pixel location of the vehicle on the video received from the garage camera, command the display to provide a notification indicative that the vehicle is properly parked in the garage.

* * * * *